(12) United States Patent
Johannesson

(10) Patent No.: US 9,573,657 B2
(45) Date of Patent: *Feb. 21, 2017

(54) AIR LUBRICATION SYSTEM

(71) Applicant: Johannes Johannesson, Espergaerde (DK)

(72) Inventor: Johannes Johannesson, Espergaerde (DK)

(73) Assignee: SILVERSTREAM TECHNOLOGIES B.V., Amstelveen (NL)

( * ) Notice: Subject to any disclaimer, the term of this patent is extended or adjusted under 35 U.S.C. 154(b) by 47 days.

This patent is subject to a terminal disclaimer.

(21) Appl. No.: 14/379,866

(22) PCT Filed: Feb. 19, 2013

(86) PCT No.: PCT/NL2013/050107
§ 371 (c)(1),
(2) Date: Aug. 20, 2014

(87) PCT Pub. No.: WO2013/125951
PCT Pub. Date: Aug. 29, 2013

(65) Prior Publication Data
US 2016/0075406 A1    Mar. 17, 2016

(30) Foreign Application Priority Data

Feb. 21, 2012 (EP) ..................... 12156379

(51) Int. Cl.
*B63B 5/14* (2006.01)
*B63B 1/38* (2006.01)

(52) U.S. Cl.
CPC ............ *B63B 1/38* (2013.01); *B63B 2001/387* (2013.01); *Y02T 70/122* (2013.01)

(58) Field of Classification Search
CPC .......... B63B 1/34; B63B 1/38; B63B 2001/34; B63B 2001/38; B63B 2001/385; B63B 2001/387
(Continued)

(56) References Cited

U.S. PATENT DOCUMENTS 5,339,761 A    8/1994  Huang
6,145,459 A   11/2000  Takahashi et al.
(Continued)

FOREIGN PATENT DOCUMENTS

GB    1223713       3/1971
WO    2010064911    6/2010

OTHER PUBLICATIONS

International Search Report dated Jun. 24, 2013, corresponding to PCT/NL2013/050107.
(Continued)

*Primary Examiner* — Daniel V Venne
(74) *Attorney, Agent, or Firm* — Young & Thompson

(57) ABSTRACT

A system for providing an air lubricating layer between a substantially flat bottom (3) of a vessel (1) and the water flowing under the bottom as the vessel is moving through the water, whereby the system includes sidewalls (5,5') and a top wall (4) defining a cavity (6) with an opening (13) situated in an interface plane that is transversal to the sidewalls (5,5'), at the level of the flat bottom (3), the opening having a front end (9) and a rear end (15) seen in the length direction of the cavity, an air inlet (10) spaced from the opening for introducing air into the cavity, whereby the length of the opening (13) of the cavity (6) is between 2 and 10 m and the distance (H) of the top wall (4) from the interface plane is between 0.2 m and 0.5 m.

2 Claims, 2 Drawing Sheets

(58) Field of Classification Search
USPC .............................................. 114/67 A, 67 R
See application file for complete search history.

(56) References Cited

U.S. PATENT DOCUMENTS

| | | | |
|---|---|---|---|
| 2002/0017228 A1* | 2/2002 | Burg | B63B 1/38 |
| | | | 114/67 A |
| 2002/0083878 A1* | 7/2002 | Burg | B63B 1/38 |
| | | | 114/289 |
| 2003/0159637 A1* | 8/2003 | Osmundsvaag | B63B 1/042 |
| | | | 114/67 A |
| 2004/0154514 A1* | 8/2004 | Burg | B63B 1/38 |
| | | | 114/67 A |
| 2009/0126618 A1 | 5/2009 | Winkler et al. | |
| 2012/0097086 A1* | 4/2012 | Sancoff | B63B 1/107 |
| | | | 114/15 |
| 2015/0298767 A1* | 10/2015 | Johannesson | B63B 1/38 |
| | | | 114/63 |

OTHER PUBLICATIONS

International Preliminary Report of Patentability dated Jun. 24, 2014, corresponding to PCT/NL2013/050107.

* cited by examiner

AIR LUBRICATION SYSTEM

FIELD OF THE INVENTION

The invention relates to a system for providing an air lubricating layer between the hull of a vessel and the water flowing under the hull as the vessel is moving through the water. The invention also relates to a displacement vessel comprising such a system, to a method of operating such a system in a displacement vessel and to a method of providing such a system in a displacement vessel.

BACKGROUND OF THE INVENTION

WO 2010/064911 describes how to generate a layer of micro bubbles on the hull of a displacement vessel in order to reduce frictional drag, by means of a cavity being provided in a flat bottom area of the hull of a vessel, such that an opening of the cavity is at the flat bottom area. Air is injected into the cavity at such a rate that the water level in the cavity is kept substantially at the level of the hull of the vessel. Due to the forward movement of the vessel, the air in the cavity will move relative to the water at the speed at which the vessel is moving, or seen from the cavity, the water will flow past the cavity at that speed. This difference in velocity between the air and the water causes a so-called Kelvin Helmholtz Instability (KHI) which results in a mixing of air and water at the interface between the water and the air, and in a consequential generation of a layer of small sized air bubbles. The small size of these air bubbles makes them very stable and they tend to stay in the water for a relative long period. The small bubbles generated in the cavity are released there from at the rear edge of the cavity such that they form a stable lubricating layer extending a long distance along the bottom of the hull downstream of the cavity. In this way energy savings in propulsion of a vessel can be achieved.

It is an object of the invention to provide an improved system for providing an air lubricating layer between the hull of a vessel and the water flowing under the hull as the vessel is moving through the water, which can more easily be incorporated in the hull of a vessel.

It is a further object of the present invention to provide an improved system for providing an air lubricating layer that can be operated in an efficient and stable manner in wave conditions.

It is a further object of the invention to provide a displacement vessel incorporating such a system.

It is another object of the invention to provide a method of operating such a system in a displacement vessel.

It is another object of the invention to provide a method at retrofitting such a system into the hull of an existing displacement vessel, without weakening of the existing hull.

It is another object to provide a method of retrofitting without interfering with the cargo space of the vessel.

SUMMARY OF THE INVENTION

To meet these objectives the present invention provides a system for providing an air lubricating layer between a substantially flat bottom of the hull of a vessel and the water flowing under the bottom as the vessel is moving through the water, whereby the system comprises sidewalls and a top wall defining a cavity with an opening situated in an interface plane that is transversal to the sidewalls, substantially at the level of the flat bottom, the opening having a front end and a rear end seen in the length direction of the cavity, an air inlet spaced from the opening for introducing air into the cavity, wherein the length of the opening of the cavity is between 2 m and 10 m, preferably between 2 m and 7 m, more preferably between 2 m and 5 m, and the distance (H) of the top wall from the interface plane is between 0.2 m and 0.5 m.

The inventors have realized that a length of the opening of the cavity of between 2 m and 10 m, at a height of 0.2 m to 0.5 m results in forming a stable and well-defined lubricating air-water mixture at the interface between the water and the air in the cavity. This was also found for cavities having a length of between 2 m and 5 m, for a distance of the top wall from the interface plane of between 0.2 m and 1.5 m, preferably of between 0.2 m and 1.0 m, most preferably of between 0.2 m and 0.5 m.

Compared to the relatively large opening and large volume of the cavity known from WO 2010/064911 which is suggested to be between 5 m and 30 m long, and up to 5 m in height, the inventors have found that the cavity can be made much smaller while operating in a stable and efficient manner and at the same time is more easy to incorporate into the hull of a vessel. In particular when such a system is retrofitted, it is advantageous that cavity is as small as possible in order to minimize any weakening effect of the structure of the hull. In particular, a cavity height of less than 0.5 m allows the system to be arranged between the two hulls in a double bottom or a double hull vessel, which means that the available cargo space is not affected by the incorporation of the system into the vessel. The cavity known from WO 2010/064911 has a height of up to 5 m, which means that it will extend into the cargo space of the vessel, whereby less cargo can be transported by the vessel. Furthermore, smaller systems require less material and are easier to handle.

Another disadvantage of a 30 m long cavity, such as known from WO 2010/064911, is that waves will start to form inside the cavity, whereby at the rear end of the cavity such waves will cause an uneven exiting of the water-air mixture from the cavity. This means that the lubricating layer formed between the hull and the water flowing underneath it will be uneven and thereby less efficient. The inventor has realized that the relatively short length of the cavity according to the invention and its relatively shallow shape are sufficient to form an appropriate water-air mixture at the interface between the water and the air in the cavity, which air layer when exiting the cavity extends across a long length of the flat bottom, ensuring a good lubricating effect on the hull of the vessel, and that at the same time no significant wave formation will occur in such a short cavity. The cavity according to the invention is relatively insensitive to waves and functions well without loss of air even when the vessel has large heave, roll and pitch motions.

It has also been found that air consumption by use of a relatively small cavity can be reduced while still maintaining an effective friction reducing lubricating effect. Apart from the more uniform and thereby improved lubricating effect obtained by such a relative short cavity, it is also advantageous that the chamber is relative short when it has to be retrofitted into the existing hull of a vessel. It saves material and labor cost when it has to be welded into the hull.

Preferably, the cavity has a width between 0.5 m and 1.5 m. Several cavities can be distributed across the hull of the vessel side by side and/or behind the other when seen in a length direction.

When at least the portion of the rear end of the cavity being adjacent the opening is sloping towards the opening, the sloping wall part extending to the position of a substantially horizontal bottom plane, the air-water mixture will be guided smoothly underneath the hull and provide a uniform lubricating effect even when the vessel is rolling or moving due to waves on the sea, and thereby ensure an even release of the lubricating layer underneath the hull of the vessel. Preferably, the system is applied in a flat bottom vessel and the rear end of the cavity slopes downwardly to intersect the bottom plane of the hull in order for a smooth transition of the bubbles formed in the cavity. Preferably, the sloping wall part of the cavity is tangent to the bottom plane at the position of the bottom plane to provide a stable transition of the air bubble layer from the cavity along the substantially flat bottom of the hull of the vessel, forming a long bubble tail extending over a long distance in a rearward direction.

Preferably, at least the portion of the rear end of the cavity being adjacent the opening is convex. This will even further improve the manner in which the lubricating layer is allowed to be introduced underneath the hull.

Preferably, means are provided to control the volume of air being introduced into the cavity proportional to a width of the cavity, dependent upon the speed of the vessel, such that for a cavity of a width of about 1 m:

at a speed of 4 m/s an airflow of between 7 and 70 $m^3/h$ is provided, at a speed of 5 m/s an airflow of between 15 and 150 $m^3/h$ is provided, at a speed of 6 m/s an airflow of between 25 and 250 $m^3/h$ is provided, at a speed of 7 m/s an airflow of between 45 and 450 $m^3/h$ is provided, at a speed of 8 m/s an airflow of between 70 and 700 $m^3/h$ is provided, at a speed of 9 m/s an airflow of between 15 and 150 $m^3/h$ is provided, at a speed of 10 m/s an airflow of between 100 and 1000 $m^3/h$ is provided, at a speed of 11 m/s an airflow of between 140 and 1400 $m^3/h$ is provided, and at a speed of 12 m/s an airflow of between 260 and 2600 $m^3/h$ is provided.

The control system can comprise a processor and memory device connected to the air compressor feeding the air into the cavity. The inventor has found a specific relationship between the speed of the vessel and the amount of air being required in order to provide a given lubricating effect, which is about proportional to the width of the cavity. Hence, the airflow can be regulated without the need for any sensors inside the cavity. This greatly simplifies the system itself, and furthermore reduces the cost involved at its installation.

Preferably, the distance between the sidewalls of the cavity decreases in a forward direction so that the front part of the cavity has a 'dagger'-shape. This shape serves to eliminate or at least reduce any wave formations which might be generated inside the cavity when the water level is not completely flush with the lower edge of the front wall.

When the system is formed as a module which, for example, is to be retrofitted into the hull of an existing vessel, it can comprise a flat plate section extending around the opening, said flat plate section being adapted to be welded into an opening in the hull of a vessel. This facilitates the installing and welding in place of the module in the hull of the vessel.

The invention also provides a system for providing an air lubricating layer between a substantially flat bottom of a vessel and the water flowing under the bottom as the vessel is moving through the water, whereby the system comprises sidewalls and a top wall defining a cavity with an opening defining an interface plane located at a distance from the top wall, substantially at the level of the flat bottom, the opening having a front end and a rear end seen, when in use, in the direction of forward movement of the vessel, an air inlet separate from the opening for introducing air into the cavity, and at least one wave deflecting member extending inside the cavity in the width direction, at a distance from the interface plane, the wave deflecting member being fixed to the side walls and/or top wall and being oriented substantially transversely to the interface plane.

Such a wave deflecting member facilitates the starting-up of the system. Before the system is activated the cavity will normally be full of water. Thus, the system must be able to be activated when the vessel is moving at its travelling speed through water.

When starting to introduce air into the cavity, the water level will be at the top of the cavity, and the flow of water under the hull of the vessel, will cause a very violent turbulence inside the cavity, drawing a large volume of air out of the cavity before the level of water has reached the level of the opening. Thus, it requires a very large airflow to start the system, much larger than what is required to run the system at a steady state. Consequently, an air source having a high capacity is required. However, if one or more wave deflecting member(s) are provided inside the cavity, the turbulence generated by the waves emerging from the front end edge of the cavity, and the turbulence generated there from will be deflected whereby less air will be drawn out of the cavity during the initial startup of the system. Consequently, an air source having a lower capacity, a capacity which is only slightly larger than what is required to run the system at a steady state, is sufficient in order to be able to start the system.

Preferably the at least one wave deflecting member is curved, whereby it will even better dampen the wave formation inside the cavity.

The invention also provides a displacement vessel having a water displacement of at least 10,000 tons, preferably 50,000 tons and more and comprising at least one cavity for providing an air lubricating layer between the hull of the vessel and the water flowing under the hull as the vessel is moving through the water, the vessel having a substantially flat bottom extending substantially across the width thereof, the flat bottom having a length of at least 10 m, preferably at least 20 m, and a propulsion device for sailing at a speed, the opening of the cavity being substantially at the level of the flat bottom, and such that a portion of the flat bottom having a length at least as great as the length of a cavity, preferable at least 15 m, extends downstream from the, or each, cavity.

In order to create a lubricating layer across the width of the hull of a large vessel a plurality of cavities can be arranged substantially adjacent over at least a part of the width of the hull.

For a long vessel, a plurality of cavities or a plurality of rows of adjacent transversely extending cavities can be arranged after each other in the longitudinal direction of the hull. The lubricating effect of the bubbles emitted from a cavity will begin to become less after 50 to 100 m, whereby, in a large vessel which can be up to 400 m long, it is appropriate to provide at least 4-8 cavities distributed in the length direction, or 4-8 rows of adjacent transversely extending cavities, after each other in the longitudinal direction of the vessel.

The invention also provides a method of operating a system for providing an air lubricating layer between the hull of a vessel having a substantially flat bottom and the water flowing under the hull as the vessel is moving through the water, the method comprising:

introducing air into the cavity to expel water out of the cavity, continue introducing air into the cavity at such a rate that the water level in the cavity will be kept substantially at the level of the outer surface of the flat bottom, whereby when the vessel is moving forwards through water the air in the cavity will mix with the water at the air-water interface, thereby forming a air-water mixture, and allowing said mixture to exit said cavity below the rear edge thereof, along the width of the opening, such that it will form a lubricating layer along the flat bottom downstream of the cavity.

Preferably the air is injected into the cavity in such a way as to avoid direct impingement onto the air-water mixture. In order for the KHI to work properly, and to avoid the formation of large bubbles which will have only a poor lubricating effect, which does not last very long, it is important that the air-water interface is not affected by a strong jet of injected air. Preferable the air is injected into the chamber via a large opening, whereby the speed of the air at the inlet opening can be kept low, preferably below 5-10 m/s.

The invention also provides a method of providing a system as set out above, in the hull of a vessel, the method comprising:

cutting a hole in the hull of the vessel, positioning the opening such that it communicates with the hole and welding the walls of the cavity to the hull of the vessel, connecting an air duct to the cavity.

According to this method, the system can easily be provided in the hull of an existing vessel, whereby energy saving for propulsion of up to 15% can be achieved in existing vessels.

BRIEF DESCRIPTION OF THE DRAWINGS

Some embodiments of a system for providing an air lubricating layer between the hull of a vessel and the water flowing under the hull as the vessel is moving through the water according to the present invention will by way of example be described in detail with reference to the accompanying drawings. In the drawings.

DETAILED DESCRIPTION OF THE INVENTION

Figure 1:
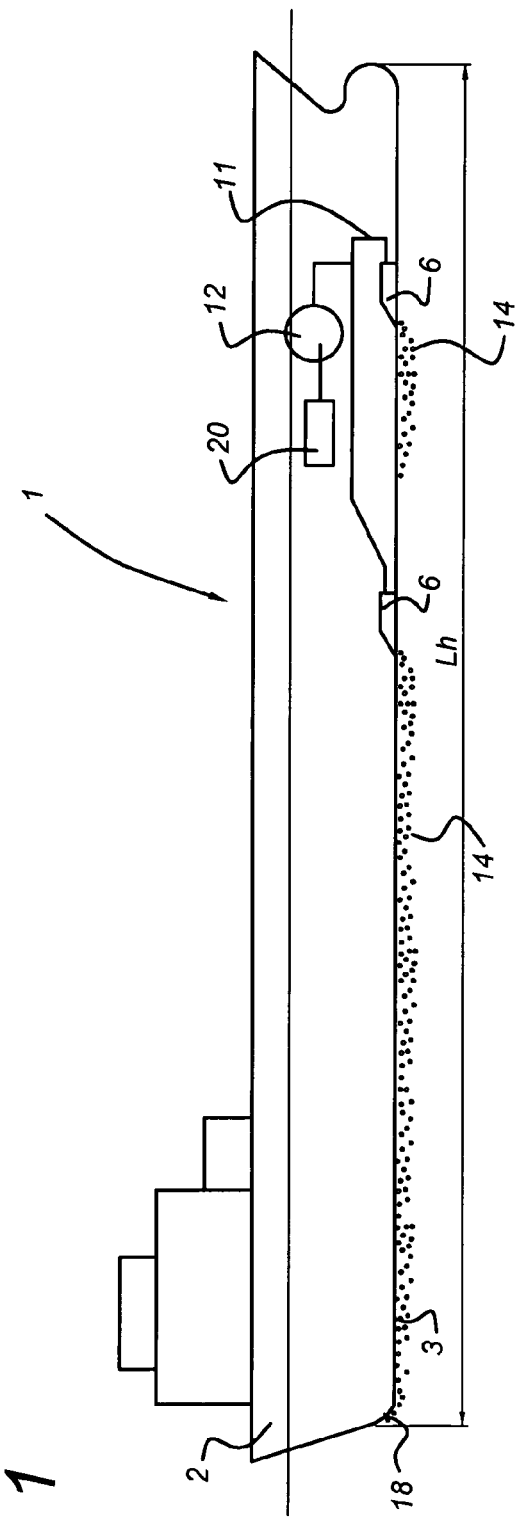
FIG. 1 shows a schematic side view of a vessel which as an example comprises two cavities arranged after each other in the hull of the vessel.

FIG. 1 shows a schematic side of a vessel 1 according to the invention having a hull 2 and a bottom surface 3. The hull 2 has a length Lh of for instance between 50 m and 400 m, measured along the bottom surface 3.

Figure 2:
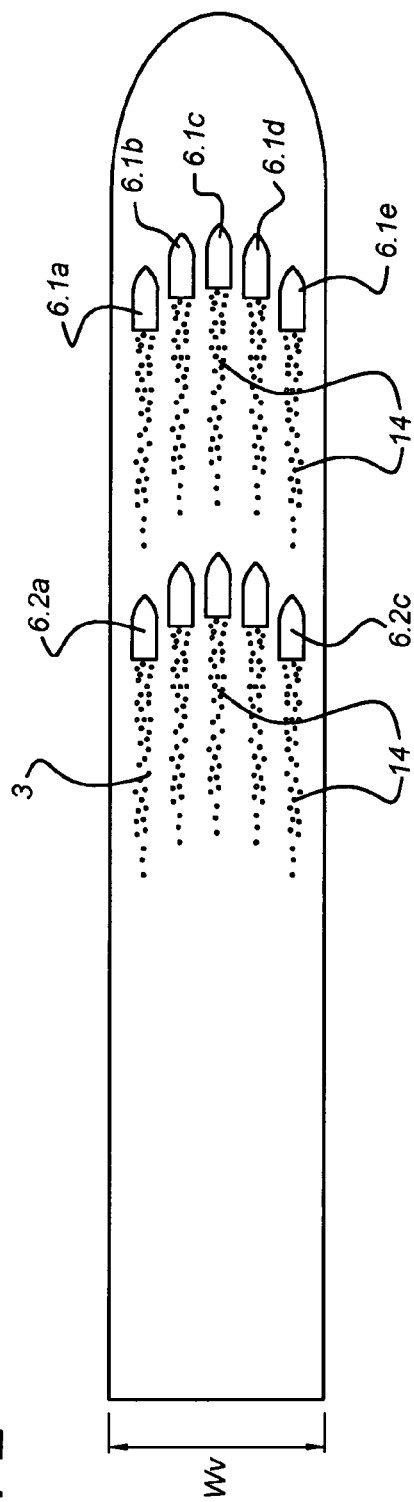
FIG. 2 shows a bottom view of the vessel.

As shown in FIG. 2 the bottom surface 3 of the vessel 1 comprises two rows of cavities 6, each having five cavities 6.1a to 6.1e and 6.2a to 6.2e arranged next to each another across the width Wv of the vessel. The width Wv may be between 10 and 50 m, for instance between 15 m and 20 m. The rows are shown as having a general V-shape, but the cavities could also be arranged on a straight of curved line, or in any other pattern. The number of cavities is selected according to the width Wv of the bottom surface 3. It is, however, also possible to have a single cavity in the bottom surface 3.

The cavities preferable all have the same dimensions, but they could also have different dimension, for example the cavities near the side of the vessel could have a different shape and/or size.

Figure 3:
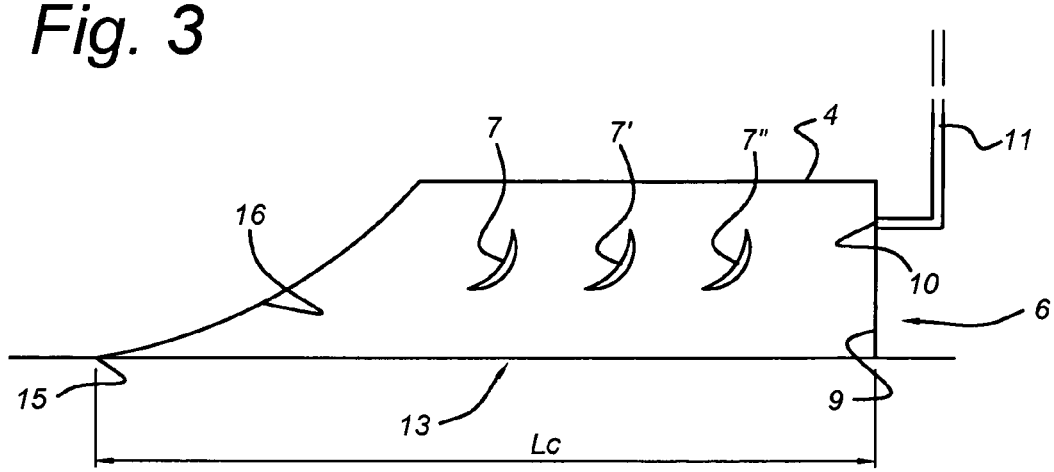
FIG. 3 shows a schematic side view of system according to the invention having curved wave deflecting members extending transversely in the cavity.
Figure 4:
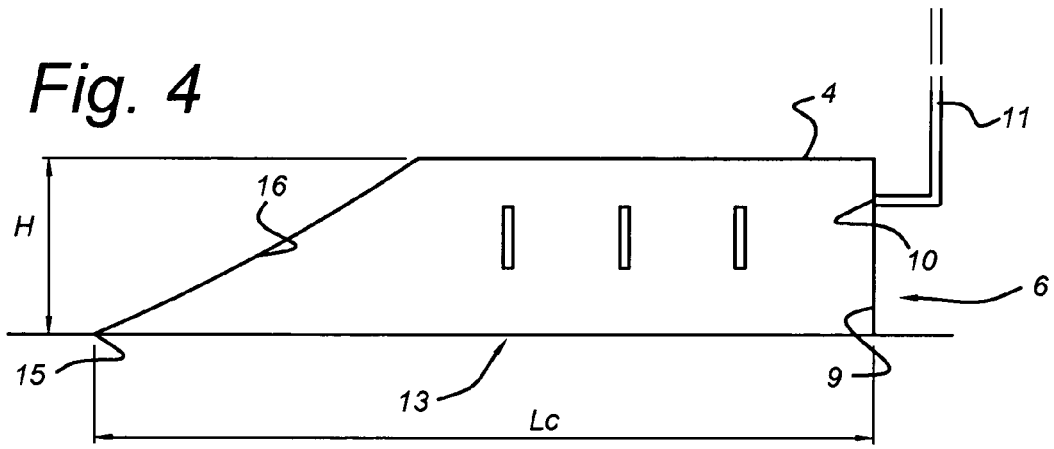
FIG. 4 shows a schematic side view of system according to the invention having substantially plane wave deflecting members extending transversely in the cavity.
Figure 5:
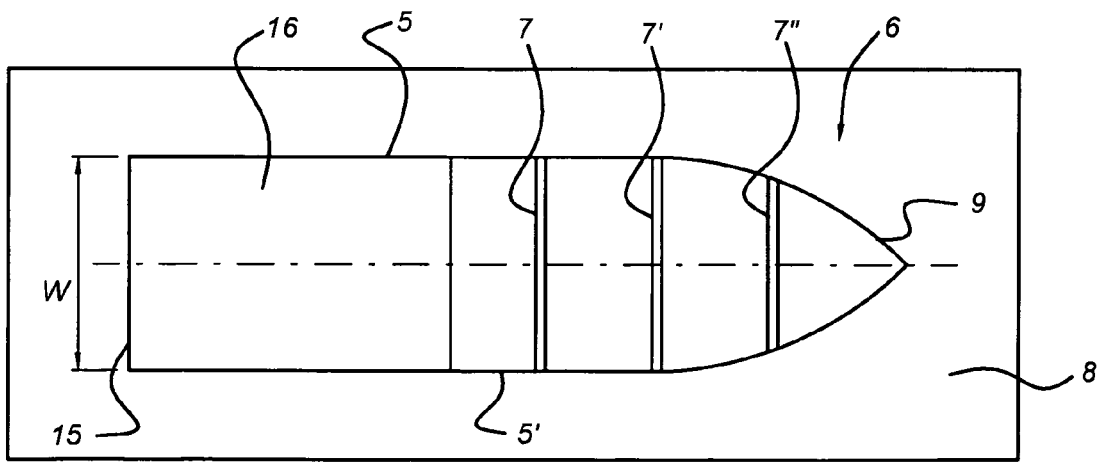
FIG. 5 shows a schematic view of the opening of a cavity, seen from the bottom of the vessel.

FIGS. 3-5 shows a cavity 6 having a front end 9, a rear end 15, a top wall 4, a rear wall 16, two side walls 5, 5', and an air inlet 10, an air supply duct 11 connected to the air inlet 10. The cavity 6 further comprises an opening 13 which is substantially flush with bottom surface 3 of the hull. The opening 13 has a length Lc which is relatively short compared the vessel length Lh and which lies between 2 m and 10 m. The width W of the opening 13 (see FIG. 5) is preferable between 0.5 m and 1.5 m. The cavity has a height H, measured from the bottom surface 3 to a top wall 4, which may be between 0.2 m and for instance 0.5 m.

Other small size cavities having a length Lc between 1.5 m and 5 m at a height H of between 0.2 m and 1.5 m, preferably 0.2 m and 1 m also provide an efficient and stable air lubricating layer.

Near a front end 9 of the cavity 6, an air inlet 10 is provided, which is connected to an air supply duct 11. A compressor 12 takes in atmospheric air through a duct 11 and supplies compressed air to the cavity 6 in order to expel water from the cavity. A controller 20, such as a computer device, is connected to the compressor 12 for operating the compressor depending on the speed of the vessel.

When the vessel is sailing through the water the moving water across the water-air interface in the cavity 6 results in a Kelvin Helmholtz Instability and forms small-sized bubbles 14. These bubbles escape via a bubble outflow region at the rear end 15 of the cavity 6. At the rear end 15, the cavity 6 has a downwardly sloping surface, forming a wedge-shaped space near the rear 15 of the cavity. From this outflow region, the bubbles 14 spread towards the aft 18 of the hull 2, to cover a majority of the bottom surface 3. The downwardly sloping surface can be formed as straight wall 16, or as a curved wall 16. The preferred embodiment of FIG. 3 shows a curved rear wall 16 which at the position 15 of the bottom surface 3 is tangent with said bottom surface 3. In order for the bubbles to be guided smoothly out of the cavity it is sufficient that the lower part of the rear wall 16 is curved or inclined. For a smooth transition of the bubbles from the cavity is important the rear wall 16 extends all the way to the position 15 of the bottom surface 3. It is not necessary that the portion of the rear wall 16 being adjacent the top wall 4 is curved or inclined. This portion of the rear wall 16 could, for example, be vertical.

As shown in FIGS. 3 and 4, a number of wave deflecting members 7, 7', 7" extends transversely inside the cavity 6. These wave deflecting members stay clear from the top wall 4 and/or side walls 5, 5'for allowing a free flow of air through the cavity. Alternatively, the wave deflecting members extend to the top wall 4 and/or side walls 5,5 but are transparent for air, for instance by being provided with perforations, or forming a mesh like pattern. These wave deflecting members 7, 7', 7" facilitate the starting-up of the system. Before the system is activated the cavity 6 will normally be full of water. The wave deflecting members 7, 7', 7" serve to deflect the waves emerging from the front end 9 of the cavity 6 when the vessel in moving forward through the water, and the turbulence generated there from will be deflected whereby less air will be drawn out of the cavity 6 during the initial startup of the system. A single wave deflecting member 7 might be sufficient in some instances, whereas an improved effect is obtained by providing more wave deflecting members, such as 3 or 5, or more than 5. The wave deflecting member(s) can be fixed to the sidewalls 5, 5' and/or to the top wall 4.

The at least one wave deflecting member 7 can be curved, or it can be formed by a substantially plane element arranged vertically, or at an inclined angle, such that it sloped towards the aft 18 of the hull 2 in a downward direction. The members 7, 7', 7" can be solid or, optionally, be provided with holes or openings extending from a front to a rear side of a member 7, 7', 7".

The invention claimed is:

1. A system for providing an air lubricating layer between a substantially flat bottom of a vessel and water flowing under the substantially flat bottom as the vessel is moving through the water, the system comprising:

sidewalls;

a top wall defining a cavity with an opening defining an interface plane located at a distance from the top wall, substantially at a level of the substantially flat bottom, the opening having a front end and a rear end configured to be seen in a direction of forward movement of the vessel;

an air inlet separate from the opening configured for introducing air into the cavity; and at least one wave deflecting member extending inside the cavity in a width direction, at a distance from the interface plane, the wave deflecting member being fixed to the side walls and/or top wall and being oriented substantially transversely to the interface plane.

2. The system according to claim 1, the at least one wave deflecting member is curved.

* * * * *